United States Patent [19]

Butterfield et al.

[11] Patent Number: 4,873,879
[45] Date of Patent: Oct. 17, 1989

[54] VARIABLE SPEED TRANSMISSION

[75] Inventors: Roger P. Butterfield, Interlaken; Guenter J. Neumann, Ithaca; Curt A. Wykstra, Dryden, all of

[73] Assignee: Borg-Warner Automotive, Inc., Troy, Mich.

[21] Appl. No.: 93,671

[22] Filed: Sep. 8, 1987

[51] Int. Cl.[4] .......................................... F16H 37/02
[52] U.S. Cl. ........................................ 74/689; 74/745
[58] Field of Search ................ 74/689, 665 GE, 745; 474/1, 2; 192/0.076

[56] References Cited

U.S. PATENT DOCUMENTS

| | | | |
|---|---|---|---|
| 4,060,012 | 11/1977 | Giacosa | 74/689 |
| 4,294,137 | 10/1981 | Piret et al. | 74/665 GE |
| 4,458,558 | 7/1984 | Frank | 74/665 BE |
| 4,478,105 | 10/1984 | Yamamuro et al. | 74/689 |
| 4,484,493 | 11/1984 | Yamamuro et al. | 74/689 |
| 4,539,866 | 9/1985 | Koivunen | 74/689 |
| 4,608,885 | 9/1986 | Koivunan | 74/740 |
| 4,633,736 | 1/1987 | Sakakibara et al. | 74/689 |
| 4,682,518 | 7/1987 | Takada et al. | 74/689 |
| 4,685,358 | 8/1987 | Itoh | 74/689 |

FOREIGN PATENT DOCUMENTS 0017060  1/1984  Japan ..................... 474/1

*Primary Examiner*—Dwight G. Diehl
*Attorney, Agent, or Firm*—Robert L. Zieg; James J. Jennings; James A. Geppert

[57] ABSTRACT

A continuously variable transmission including a driving shaft connected to an engine output member and a driven shaft. The shafts are interconnected by a stepless variable coupling. A bidirectional gear drive mechanism connects the driven shaft to a differential mechanism having two output shafts extending therefrom. The drive mechanism includes a two gear forward and a three gear reverse drive path, each of which is controlled by a fluid-actuated starting clutch mechanism. Each gear path is adapted to drive a transfer gear which continually intermeshes with a ring gear of the differential defining another gear mesh. By such construction, the output shafts and the engine output member may rotate in the same direction during a forward drive mode of operation.

4 Claims, 2 Drawing Sheets

VARIABLE SPEED TRANSMISSION

FIELD OF THE INVENTION

This invention generally relates to transmissions and, more specifically, to a continuously variable transmission for a vehicle.

BACKGROUND OF THE INVENTION

A continuously variable transmission having driving and driven pulley assemblies with a belt entrained thereabout to interconnect the pulley assemblies is known in the art. In such an arrangement, each pulley assembly comprises an axially fixed sheave or pulley member fixed on its associated shaft and a complimentary axially movable sheave or pulley member slidably arranged on its associated shaft. The axially movable sheave or pulley member is controllably moved toward and away from the other sheave to change the drive ratio between the driving shaft and the driven shaft. The driven shaft may be interconnected to a differential by a gear mechanism. Two output shafts usually extend from the differential to the drive wheels of the vehicle.

S. Yamamuro et al U.S. Pat. No. 4,484,493 discloses one example of a continuously variable transmission. The Yamamuro device includes a torque converter disposed between an engine and a pair of pulley assemblies. As such, the driven pulley in the pair of pulley assemblies has applied thereto a multiple of the engine torque as controlled by the torque converter. The driving and driven pulley assemblies are drivingly connected to a differential through a gear mechanism. The gear mechanism of the Yamamuro et al device includes a one gear forward drive path controlled by a clutch mechanism and a three gear reverse drive path also controlled by a clutch mechanism. Both of the gear paths mesh with a ring gear of a differential mechanism. The vehicle's direction is controlled through selective operation of one or the other of the two clutch assemblies.

The Yamamuro et al disclosure suggests that such an arrangement provides design advantages regarding the overall size of the transmission. Although this may be true, the disclosed transmission is not without its drawbacks. More specifically, the disclosed gear drive mechanism for connecting the driven shaft to the differential severely restricts or limits this device. That is, the one gear forward drive path of the drive mechanism inherently causes the engine output drive member to rotate in a direction opposite to that of the output shafts of the differential. With a transmission constructed in accordance with the Yamamuro et al teachings, the output shafts extending from the differential for driving the wheels are rotatably driven in a direction opposite to the rotary direction of the engine in a forward mode of operation. In practice, the vast majority of today's cars are designed to have the engine and its drive wheels turn in the same direction in the forward operative mode. Accordingly, and without some major redesign efforts, the Yamamuro et al device does not lend itself to the vast majority of today's vehicles. As is apparent from further analysis, the drive mechanism of the Yamamuro et al device lacks any possibility for change. That is, because the one gear forward path and the three gear reverse path both engage the ring gear of the differential, neither the gears comprising the drive mechanism nor the ring gear can be interchanged to improve the effective drive ratios of either the drive mechanism or the differential. From a design standpoint, it would be beneficial to have the capability of modulating drive ratios through the driven and drive pulley assemblies as well as through the gear mechanism and the differential. The Yamamuro et al device lacks this capability.

SUMMARY OF THE INVENTION

In view of the above, and in accordance with the present invention, there is provided a continuously variable transmission which allows the engine output member and the vehicle's drive wheels to turn in the same direction in a forward mode of operation. Moreover, the transmission of the present invention lends itself to improved vehicle performance by permitting the output speed of the drive wheels to be determined by either the drive ratio established in a stepless variable coupling and/or through a drive path incorporating interchangeable gears.

More specifically, the transmission of the present invention includes a driving shaft connected to an engine output member and a driven shaft. The shafts are interconnected by a stepless variable coupling including driving and driven pulley assemblies. The driving pulley is arranged on the driving shaft such that it receives only engine torque. Unlike the Yamamuro device, the preferred embodiment of the present invention does not use a torque converter for applying multiples of engine torque to the driving pulley assembly. The driven pulley assembly is arranged on the driven shaft and an endless belt is entrained about the pulley assemblies for transferring rotary force or motion therebetween. Each of the pulley assemblies includes a sheave or pulley member fixed to its respective shaft and an axially shiftable sheave or pulley member. The axial disposition of the movable sheave of each assembly controls the drive ratios established between the driving and driven shafts. The transmission further includes a differential mechanism which is adapted to have two output shafts extending therefrom to drive the wheels of the vehicle.

A unique bidirectional drive mechanism operably connects the driven pulley assembly with a ring gear of the differential. This gear mechanism includes a two gear forward drive path and a three gear reverse drive path. Either gear path drives a transfer gear arranged in continual mesh with the ring gear of the differential. The forward and reverse gear paths are each controlled by a fluidically actuated clutch defining a slippable connection which avoids excess loads being applied to the belt.

The two gear forward and three gear reverse drive paths included in the gear mechanism afford unbeknownst advantages. First, the two gear forward drive path allows a transfer of rotary motion such that the engine output member and the output shaft of the differential rotate in the same direction in a forward drive mode. Moreover, because none of the gears included in the two gear forward drive path directly connect or intermesh with the ring gear, they may be interchanged with gears of different sizes to vary the output of the transmission without changing the effective drive radius of the stepless variable coupling. In a like manner, none of the gears of the three gear reverse drive path intermesh or are directly interengaged with the ring gear of the differential. As such, any of these gears may be interchanged with others of different sizes to vary the transmission output while the stepless variable coupling maintains the same effective drive radius. Because the transfer gear and ring gear define a seperate gear mesh, these gears may also be interchanged to change the differential ratio.

In view of the above, a primary object of this invention is the provision of a continuously variable transmission incorporating forward and reverse drive paths within a space saving design.

Another object of this invention is the provision of a continuously variable transmission adapted for connection to an engine and including a mechanism which drives the output shafts thereof in the same direction as the output member of the engine when engaged in a forward drive mode.

Still another object of this invention is the provision of a continuously variable transmission having a two gear forward and three gear reverse drive paths, both of which are drivingly connected to a differential through another gear mesh such that any one or more of the elements in each gear mesh may be interchanged with other elements.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter set forth in detail to enable those skilled in the art to readily understand the function, operation, construction and advantages of same when read in conjunction with the accompanying drawings in which.

DETAILED DESCRIPTION OF THE PRESENT INVENTION

Figure 2:
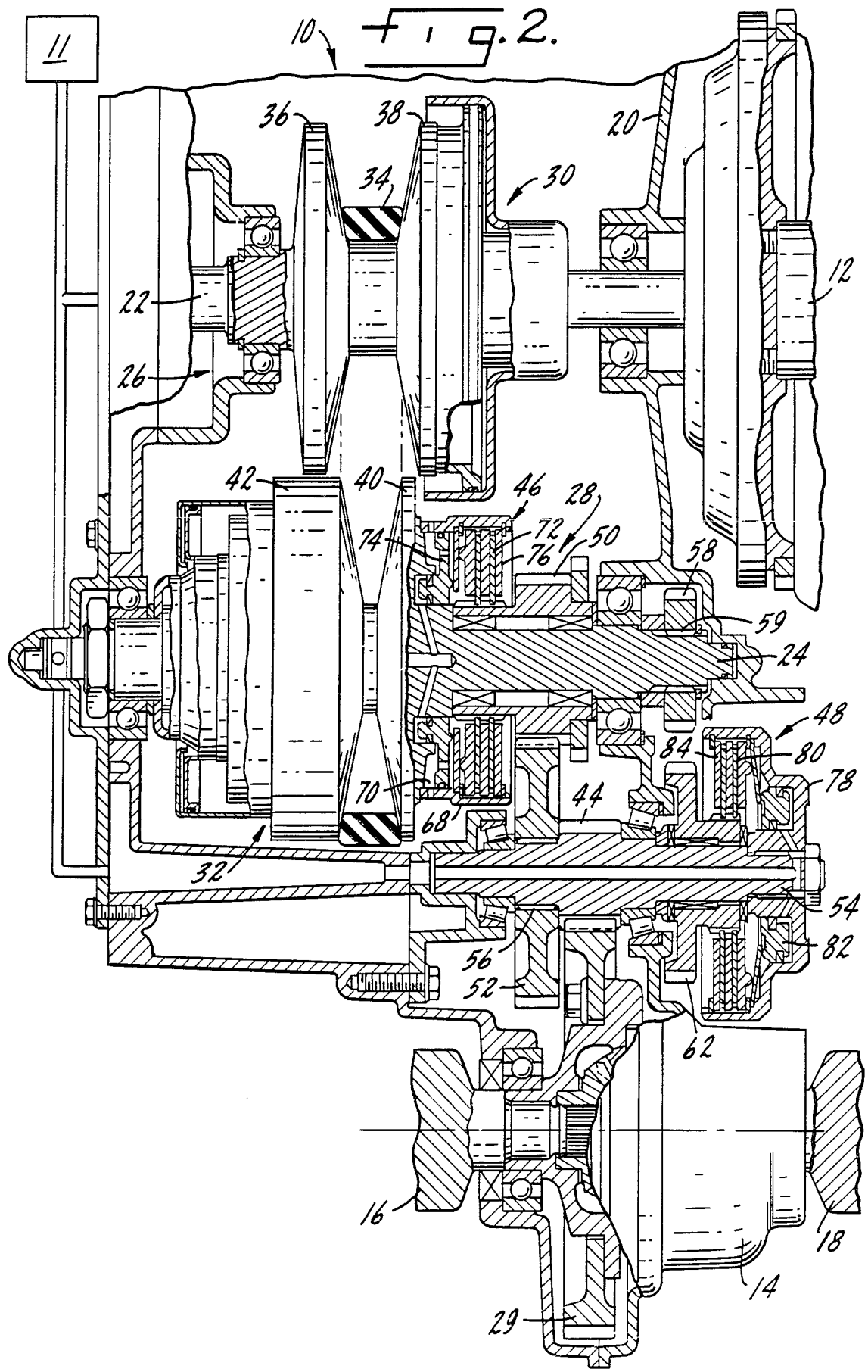
FIG. 2 is a sectional view taken along line 2—2 of FIG. 1 schematically illustrating a transmission which incorporates the teachings of the present invention.

Referring now to the drawings, wherein like reference numerals indicate like parts throughout the several views, FIG. 2 schematically illustrates a continuously variable transmission 10. The transmission is operable in forward and reverse modes as determined by a control system 11. The transmission 10 is designed for use in combination with a motor vehicle and any other powered device in which an automatically variable speed ratio between driving and driven members is desirable. In the illustrated embodiment, the transmission is disposed between an engine output member 12 and a differential mechanism 14. The differential may have at least two rotary power output shafts 16, 18 extending therefrom toward traction wheels, i.e., front wheels of a vehicle.

The transmission includes a housing 20 having rotatably mounted therein a driving shaft 22 and a driven shaft 24. The driving shaft 22 is operably connected to the engine output member 12 through conventional means. The driving shaft 22 and driven shaft 24 are connected by a stepless variable coupling means 26. A bidirectional drive mechanism means 28 transmits rotary force or motion between the driven shaft 24 and an interchangable ring gear 29 provided on the differential mechanism 14.

The stepless variable coupling 26 includes a driving pulley assembly 30 and a driven pulley assembly 32 which are interconnected or linked by a force transfer member in the form of an endless belt 34. In the form illustrated in FIG. 2, the driving pulley assembly 30 is drivingly connected to driving shaft 22 such that it "sees" only engine torque. The driving pulley 30 assembly includes a pair of split sheaves 36 and 38 having opposed conical faces which engage the belt or force transfer means 34. Sheave 36 is fixedly mounted on the power or driving shaft 22 and rotates therewith. The other sheave 38 is axially slidable with respect to sheave 36 and shaft 22. By such construction, the effective or operative pulley diameter of the driving pulley assembly 30 is modulated as a function of the displacement of sheave 38 relative to sheave 36. In an analogous manner, the driven pulley assembly 32 includes a pair of split sheaves or pulley flanges 40 and 42 having opposed conical faces which engage the belt or force transfer means 34. Sheave or pulley member 40 is fixedly mounted on the driven shaft 24. The other sheave or pulley member 42 is axially slidable with respect to sheave 40 and to the shaft 24. By such construction, the operative or effective pulley diameter of the pulley assembly 32 may be modulated as a function of the lateral disposition of the movable sheave 42. A speed changing mechanism or means (not shown) common to both the driving and driven pulley assemblies 30, 32 adjusts the disposition of the movable sheaves 38 and 42. These adjustments are so correlated that the effective radius of driving pulley assembly 30 varies inversely with reference to the effective driving radius of driven pulley assembly 32.

Figure 1:
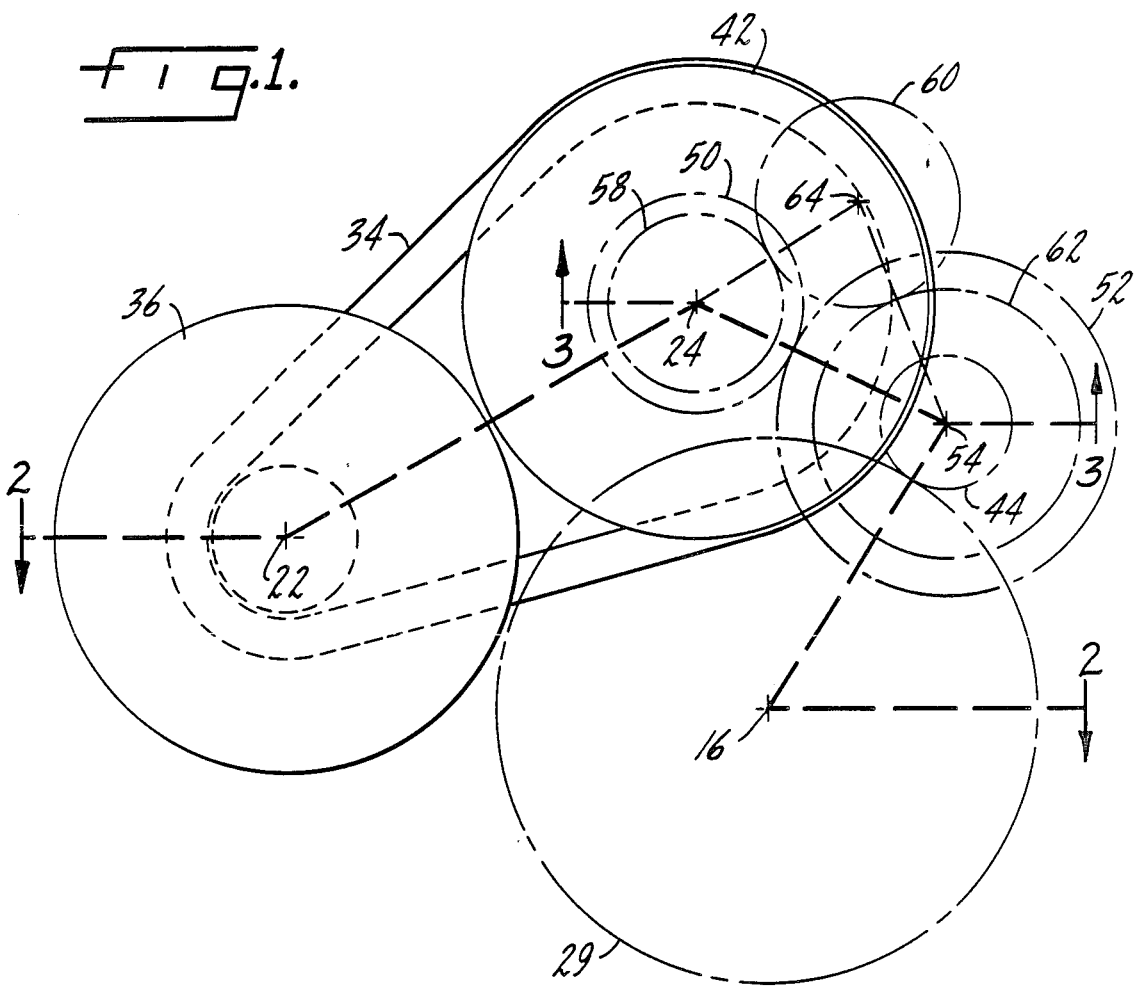
FIG. 1 is a schematic end view illustrating the arrangement of component parts comprising the present invention.
Figure 3:
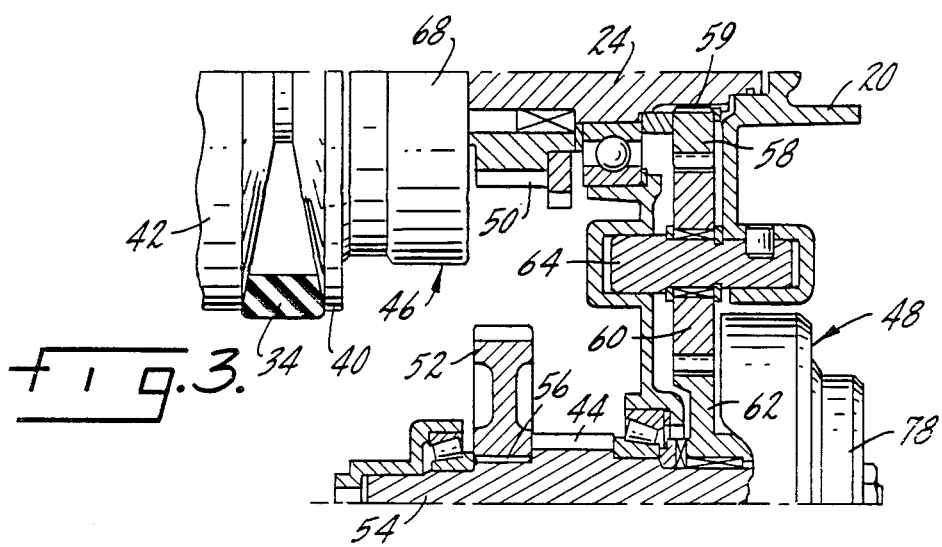
FIG. 3 is a sectional view taken along line 3—3 of FIG. 1 illustrating a driving connection provided in the present invention for the transfer of rotary motion.

The bidirectional gear drive mechanism means 28 is comprised of a two gear forward and three gear reverse drive paths, a transfer gear 44 driven by either gear path and connected to the ring gear 29 of the differential 14, and forward and reverse clutch assemblies 46, 48, respectively, for controlling the rotational direction of the output shafts 16 and 18. The forward drive path includes a forward gear 50 intermeshing with an intermediate gear 52. The forward gear 50 is rotatably mounted on the driven shaft 24. The intermediate gear 52 is arranged in a driving relationship with an intermediate shaft 54 rotatably mounted in the housing 20. The forward gear 50 and intermediate gear 52 are arranged on their respective shafts 24 and 54 such that, and if desired, they may be interchanged with gears of different sizes to establish different drive ratios through the first or forward drive path. In the preferred embodiment, a spline connection 56 serves to drivingly connect gear 52 to shaft 54. The operable effectiveness of the forward drive path is controlled by the first or forward clutch assembly 46. The three gear reverse drive path includes a reverse gear 58, an idler gear 60 and a driven gear 62 (FIGS. 1 and 3). The reverse gear 58 is arranged in a driving relationship with the driven shaft 24. In the preferred embodiment, a spline connection 59 serves to drivingly connect gear 58 to shaft 24. As best illustrated in FIG. 3, the driven gear 62 is rotatably mounted on the intermediate shaft 54. The idler gear 60 serves to drivingly connect the reverse gear 58 with the driven gear 62 mounted on shaft 54. The idler gear 60 is mounted for rotation about the longitudinal axis of a stub shaft 64 arranged in housing 20. As with the first drive path, reverse gear 58 and driven gear 62 are arranged on their respective shafts such that, and if so desired, they may be interchanged with gears of different sizes to establish different drive ratios through the second or driven drive path. The operative effectiveness of the second or reverse drive path is controlled by the second or reverse clutch assembly 48. Returning to FIG. 2, the transfer gear 44 is arranged in a driving relationship with the intermediate shaft and is disposed between the intermediate and driven gears 52, 62, respectively. The transfer gear 44 is rotatably driven by either gear path and is in continuous meshing engagement with ring gear 29 of the differential mechanism 14, to define another gear mesh. In the preferred embodiment, either and/or both gears 29 and 44 may be interchanged with others in a manner changing the differential ratio.

As best seen in FIG. 2, the driven pulley assembly 32 includes a hollow cylindrical, axially extending portion 68 which defines an annular recess 70. At least a portion of the first clutch assembly 46 is disposed in the recess 70. By such construction, the axial length of the transmission may be minimized. The clutch assembly 46 is a fluid actuated apparatus preferably of the type disclosed in R. L. Smirl; U.S. Pat. Nos. 4,433,594 and 4,436,193 the complete teachings of which are incorporated herein by reference. Suffice it to say, the clutch assembly 46 includes a series of interleaved plates 72 disposed between a fluidically actuated ram or piston 74 arranged in the recess 70 and a pressure plate 76. Those friction plates which are drivingly connected to the cylindrical extension 68 of the driven pulley assembly define driving parts of the clutch assembly. Those alternate friction plates which are drivingly associated with the forward gear 50 define driven parts of the clutch assembly. This assembly provides a slippable connection between the driven pulley assembly 32 and forward gear 50 to avoid excess loads being applied to the belt means 34.

Likewise, clutch assembly 48 is a fluid actuated apparatus of the type disclosed in the above-identified patents. Suffice it to say, the second or reverse clutch assembly 48 includes a clutch drum member 78 having axially extending internal splines provided on its interior cylindrical surface. The clutch assembly 48 further includes a series of interleaved plates 80 disposed between a fluidically actuated ram or piston 82 arranged in the drum 78 and a pressure plate 84 secured to the drum 78. Some of the plates 80 are splined in a known manner to the drum 78. These plates define driven parts of the clutch assembly 48. The alternate friction plates are drivingly connected to the driven gear 62 and define driving parts of the clutch assembly 48. This assembly provides a slippable connection between shaft 54 and the driven pulley assembly to avoid excess loads being applied to the belt means 34.

With the structural details of the various parts of the transmission having been adequately described, attention may now be directed to the operation of the transmission. Because of the connection therebetween, rotary motion of the engine's output member 12 is imparted directly to the driving shaft 22 of the transmission. Rotary motion is transmitted from the driving shaft 22 to the driven shaft 24 through the stepless variable coupling means 26. When the transmission is in neutral, the forward and reverse clutch assemblies 46 and 48, respectively, are both disengaged. As such, there is no power transmission from the driven shaft 24 to the transfer gear 44. With no motive or rotary power being transmitted to the transfer gear 44, the differential mechanism 14 is inoperative and the vehicle is at rest.

To establish a forward drive range, the forward clutch assembly 46 is controllably applied and the reverse clutch assembly 48 is disengaged. With clutch assembly 46 engaged or applied, rotary power is transferred from the driven pulley assembly 32 of the variable coupling 26 to the forward drive gear 50 of the forward gear drive path. Because of their meshing engagement, drive gear 50 transmits its rotary motion to the intermediate gear 52 which is drivingly connected with the intermediate shaft 54. As such, rotary motion is imparted to the intermediate shaft and, therefore, to the transfer gear 44 fixedly arranged thereon. Then, the transfer gear 44 drives the ring gear 29 of the differential 14 thus allowing the vehicle to move forward. Once the vehicle begins its forward movement, the stepless variable coupling means 26 automatically controls, in a known manner, the operative conditions of the vehicle by adjusting the axial disposition of the movable sheaves 38 and 42. Because this transmission is provided with a two gear forward drive path, the rotational direction of the output power shafts 16, 18 coincide with the rotational direction of movement of output member 12 in the forward drive mode. Moreover, the provision of a two gear forward drive path lends added flexibility to the transmission. That is, gears 50, 52 may be interchanged with others to establish different driving ratios in the forward range given the same operative or effective radius of the stepless variable coupling 26.

For establishing a reverse drive range, the reverse clutch assembly 48 is controllably applied and the forward clutch assembly 46 is disengaged. Under these conditions, driven shaft 24 rotatably drives the reverse gear 58 of the three gear reverse drive path. The reverse drive path allows the rotary motion of the reverse gear 58 to be imparted to the driven gear 62 arranged on intermediate shaft 54 through the idler gear 60 (FIG. 3). The rotatably driven gear 62, in turn, drives the drum 78 of the engaged or applied clutch assembly 48. With drum 78 being drivingly connected to the intermediate shaft 54, the transfer gear 44 is rotatably driven in a reverse direction. Then, the transfer gear 44 drives the ring gear 29 of the differential 14 allowing the vehicle to move in reverse. The provision of a three gear reverse drive path lends further flexibility to the transmission. That is, gears 58, 60, 62 could be interchanged with others to establish different drive ratios in the reverse range of movement given the same operative or effective radius of the steplessly variably coupling. Moreover, by allowing ring gear 29 and transfer gear 44 to be interchanged, the differential ratio may also be changed.

Thus, there has been provided a VARIABLE SPEED TRANSMISSION which fully satisfies the aims, objects, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described our invention, what we claim is:

1. In combination with a vehicle including an engine having a rotary output member, a continuously variable transmission operable in forward and reverse modes, said transmission comprising:

a driving shaft directly connected to said rotary output member;

a driven shaft;

stepless variable coupling means for interconnecting said shafts, said coupling means comprising driving and driven pulley assemblies which are interconnected with an endless belt, each pulley assembly including a pair of split sheaves, with one sheave being fixedly mounted and the other sheave being axially slidable on their respective shafts;

a differential having a ring gear for driving at least one rotary output power shaft extending from said differential; and bidirectional gear drive mechanism means for transferring rotary motion between said driven shaft and said differential such that said rotary output member and said rotary output power shafts rotate in the same direction during the forward mode of operation, said mechanism means comprising:

a two gear forward drive path including a forward gear rotatably mounted on said driven shaft and intermeshing with an intermediate gear spline connected to an intermediate shaft; a three gear reverse drive path including a reverse gear mounted on said driven shaft, an idler gear mounted on a stub shaft and a driven gear which is rotatably mounted on said intermediate shaft; a transfer gear connected onto said intermediate shaft between said intermediate gear and said driven gear for continuous meshing engagement with the differential ring gear and adapted to be driven by either gear mesh; a first fluid actuated starting clutch assembly for selectively connecting said driven shaft with said output power shafts through said differential and the two gear forward drive path; and, a second fluid actuated starting clutch assembly for selectively connecting said driven shaft with said output power shafts through said differential and the three gear reverse drive path, with the direction of output shaft rotation being controlled as a function of selective clutch engagement.

2. The continuously variable transmission of claim 1 wherein said first clutch assembly includes a driving part drivingly connected with said driven pulley assembly and a driven part drivingly connected with said forward gear.

3. The continuously variable transmission of claim 1 wherein at least a part of said first clutch assembly is disposed in an annular recess formed in said fixedly mounted sheave of said driven pulley assembly.

4. The continuously variable transmission of claim 1 wherein said reverse gear is spline connected to said driven shaft.

* * * * *